July 14, 1970   H. J. SCHWERDHÖFER   3,520,214
MULTIPLE SPEED HUB WITH CENTRIFUGAL SHIFTING MECHANISM
Filed Feb. 20, 1969   3 Sheets-Sheet 1

INVENTOR.
Hans Joachim Schwerdhöfer

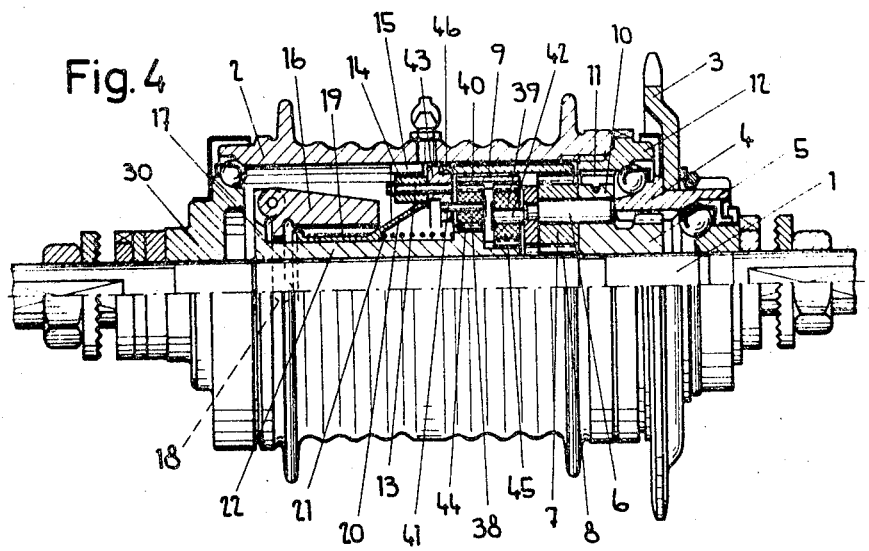
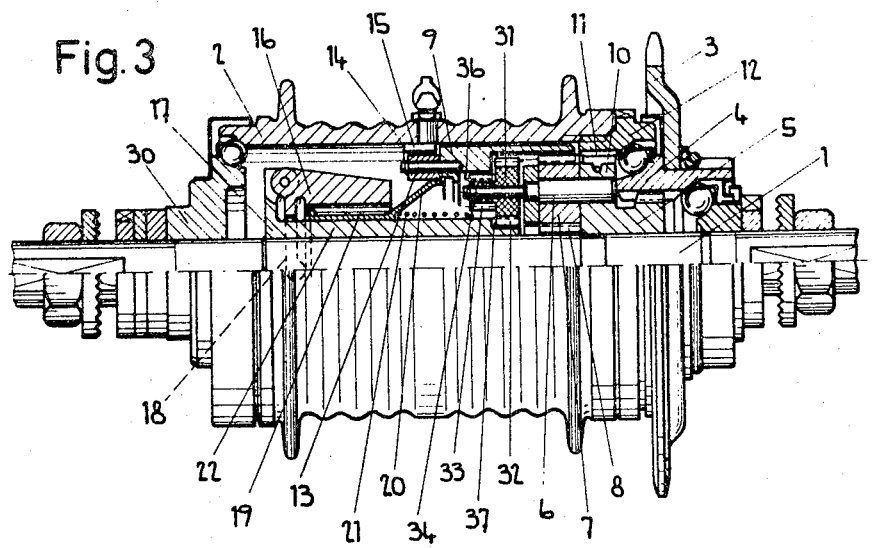

INVENTOR.
Hans Joachim Schwerdhöfer
By: Low and Berman

United States Patent Office 3,520,214
Patented July 14, 1970

---

3,520,214
MULTIPLE SPEED HUB WITH CENTRIFUGAL SHIFTING MECHANISM
Hans Joachim Schwerdhöfer, Schweinfurt (Main), Germany, assignor to Fichtel & Sachs AG, Schweinfurt (Main), Germany
Continuation-in-part of application Ser. No. 761,262, Sept. 20, 1968. This application Feb. 20, 1969, Ser. No. 801,128
Claims priority, application Germany, Mar. 1, 1968, 1,680,591
Int. Cl. F16h *3/44, 3/74*
U.S. Cl. 74—752         9 Claims

ABSTRACT OF THE DISCLOSURE

A bicycle hub including a dual-speed planetary-gear transmission is shifted between its two transmission ratios by a centrifugally operated mechanism whose flyweight is coupled to the planet carrier and the ring gear of the planetary-gear transmission by epicyclic differential gearing in such a manner that the weight rotates faster than either transmission element.

REFERENCE TO RELATED APPLICATION

This application is a continuation-in-part of my copending application Ser. No. 761,262, filed on Sept. 20, 1968.

BACKGROUND OF THE INVENTION

This invention relates to multiple-speed hubs for wheels of bicycles and like vehicles, and particularly to a centrifugally operated shifting mechanism for automatically changing the transmission ratio of the hub in response to an increase or decrease in the input speed at which the hub is driven.

As has been set forth in detail in my afore-mentioned copending application, it is desirable that the flyweight of the shifting mechanism be driven directly from the transmission, not from the driven hub shell, and I proposed to interpose a speed-increasing second transmission between the flyweight and the first transmission which connects a driver of the hub to the hub shell.

The earlier arrangement is somewhat bulky because of the multiplicity and the necessary dimensions of the transmission elements employed.

SUMMARY OF THE INVENTION

It has now been found that the desired high rotary speed of the flyweight can be achieved with a very compact second transmission if the second transmission consists of differential gearing having two input members meshingly engaging respective elements of the first transmission which rotate at different speeds, such as the planet carrier and the ring gear, and an output member driven at a rotary speed proportional to the difference in the speeds of the input members, the output member being coupled to the flyweight.

Other features, additional objects, and many of the attendant advantages of this invention will readily become apparent from the following detailed description of preferred embodiments when considered in connection with the appended drawing.

BRIEF DESCRIPTION OF THE DRAWING

In the drawing:
FIGS. 1 to 4 respectively illustrate four multiple-speed hubs of the invention in front elevation and partly in axial section.

DESCRIPTION OF THE PREFERRED EMBODIMENTS

Figure 1:
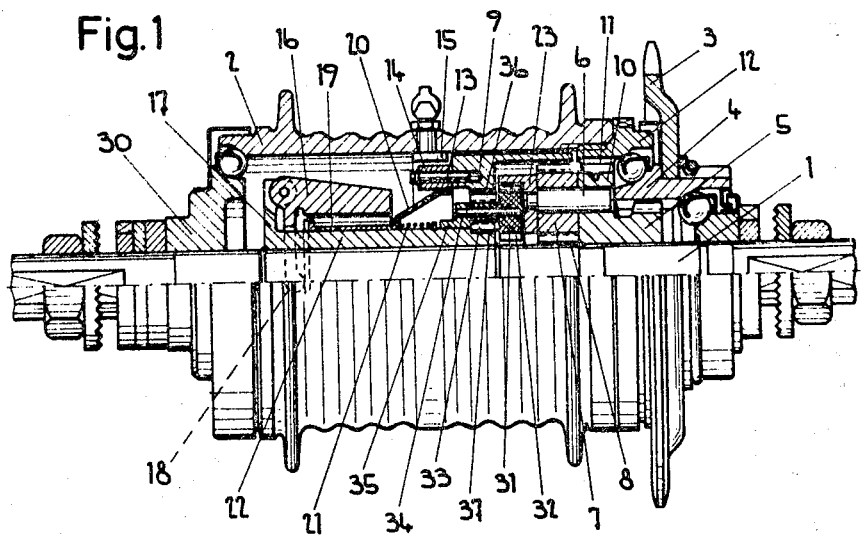

The multiple-speed hubs shown in FIGS. 1 to 4 have many features in common with each other and with the hubs described in the afore-mentioned copending application. The common features include a normally stationary shaft 1 carrying a hub shell 2 for rotation about a common axis on ball bearings arranged between the two axial ends of the shell 2 and tubular driver 4 and a normally fixed bearing member 30 respectively. A sprocket 3 is fixedly mounted on the driver 4 outside the shell 2. An axial end of the driver 4 in the hub shell 2 is connected with the planet carrier 5 of the first transmission by a claw coupling for convenience of assembly. The sprocket 3, driver 4, and planet carrier 5 rotate as a unit in all operative conditions of the hub.

Three planet shafts 6 angularly distributed on the planet carrier 5 about the hub axis carry respective planet gears 7, only one of the shafts and planet gears being visible in the drawing. The planet gears 7 simultaneously mesh with a sun gear 8 fixedly arranged on or integral with the shaft 1, and with a ring gear 9. The planet carrier 5 also provides support for pawls 10 spring-biased for engagement with a ratchet 11 on a bearing ring 12 of one of the ball bearings on which the hub shell 2 is mounted.

Two pivot pins 13 on the ring gear 9 carry a second set of pawls 14 arranged for cooperation with a ratchet 15 on the inner wall of the hub shell 2. The pawls 14 are engaged and disengaged by a centrifugally operated shifting mechanism, only one of the two pawls 14 being illustrated.

The shifting mechanism includes two flyweights 16 mounted on a supporting bracket 17 near the shaft 1 for pivoting movement in a common plane through the hub axis. Forks 18 on the flyweights 16 engages a flange on one end of a control sleeve 19, and axially shift the sleeve toward the right, as viewed in the drawing, when the flyweights pivot away from the shaft 1. The other axial end portion 20 of the sleeve 19 flares conically in a direction away from the bracket 17 and normally engages the pawls 14, which are two-armed levers, to pivot the pawls 14 out of the associated ratchet 15. When the sleeve 19 is moved toward the right, as seen in FIGS. 1 to 4, against the restraint of a helical compression spring 21, it releases the pawls 14 which are thereafter engaged with the ratchet 15 by a non-illustrated pawl spring. The compression spring 21 pushes the flange of the sleeve 19 against the forks 18, and thereby biases the flyweights toward the illustrated inoperative positions near the shaft 1.

The brackets 17 are fixedly mounted on an axially fixed coupling sleeve 22 rotatably supported on the shaft 1 and coaxially received in the control sleeve 19 and the spring 21. The coupling sleeve 22 is common to all illustrated embodiments of this invention, and extends axially from the bracket 17 toward the first transmission 5–9 for coupling the brackets 17 and the flyweights 16 to the first transmission in a manner not provided for in the earlier application.

In all illustrated embodiments of the instant invention, the coupling sleeve 22 is connected to the afore-mentioned first transmission by means of a second transmission consisting of epicyclic differential gearing whose two input members are connected to the planet carrier 5 and the ring gear 9 respectively, and whose output member drives the coupling sleeve 22 at a rotary speed higher than the speeds of the ring gear 9, and therefore substantially higher than the common rotary speed of the planet carrier 5, the driver 4, and the sprocket 3.

Referring initially to FIG. 1, the planet shafts 6 carry a common retaining ring 23 for the planet gears 7. The ring 23 has an internally toothed gear rim which meshes with a first set 32 of gear teeth on three planet wheels 31. A second set of gear teeth 33 on each planet wheel 31, smaller in diameter than the set 32, meshes simultaneously with internal gear teeth 36 on the ring gear 9 and with an external gear rim 37 on the coupling sleeve 22. The planet wheels 31 are angularly spaced about the hub axis and rotatably mounted by means of respective planet shafts 34 on a common carrier 35 rotatably supported on the sleeve 19.

Figure 2:
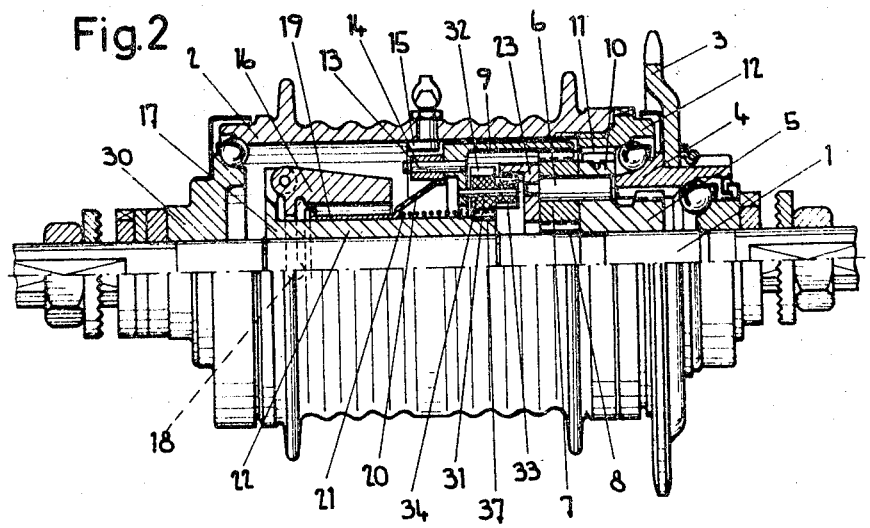

In the two-speed hub shown in FIG. 2, the shafts 34 carrying the planet wheels 31 are mounted on an inwardly projecting radial flange of the ring gear 9 which thus functions as the planet carrier of the second transmission. The smaller gear rim 33 of each planet wheel 31 meshes with the internal gear rim of the retaining ring 23 which thus constitutes the ring gear of the second transmission. The output member of the second transmission is the larger gear rim 32 of each planet wheel 31 which meshes with the external gear rim 37 of the coupling sleeve 22, the gear rim 37 constituting the sun gear of the epicyclic train.

In the third embodiment of the invention, as shown in FIG. 3, the differential gearing of the second transmission includes planet shafts 34 which are integral with the planet shafts 6 of the first transmission. The planet wheels 31 are mounted on the shafts 34. The ring gear 9 is provided with a second internal gear rim 36 which meshes with the smaller sets of teeth 33 of the planet gears 31. The sets of teeth 32 drive the meshed engaged gear rim 37 on the coupling sleeve 22.

FIG. 4 shows a modified two-speed hub of the invention whose second transmission has two sets of planet gears 38, 39 arranged in respective planes spaced along the hub axis and perpendicular to the same. The gears 38 are smaller in diameter than the gears 39. The gears 38 are rotatably supported on shafts 41 angularly offset on a planet carrier 43 connected to the ring gear 9 by a jaw coupling 46 in all operative conditions of the hub. The planet carrier 43 also carries the pins 13 on which the pawls 14 are pivoted.

The larger planet gears 39 are mounted on the planet carrier 5 of the first transmission by means of shafts 42 integral with the shafts 6. A common ring gear 40 envelops and connects the planet gears 38, 39. The planet gears 38 also mesh with an external gear rim 44 on the coupling sleeve 22, and the planet gears 39 mesh with an external gear rim 45 on the coupling sleeve.

The afore-described two-speed hubs operate as follows:

At relatively low input speeds of the sprocket 3 and the driver 4, the flyweights 16 assume the position illustrated in the drawing so that the pawls 14 are retracted from the ratchet 15 by the spring 21 and the control sleeve 19, and torque is transmitted from the sprocket 3, the driver 4, and the planet carrier 5 to the hub shell 2 at the lower transmission ratio of the hub by the pawls 10 and the ratchet 11. The hub shell 2 rotates at the same speed as the sprocket.

At a higher input speed defined by the restraining force of the spring 21, the flyweights 16 pivot counterclockwise from the illustrated position, and release the pawls 14 from the control sleeve 19. Torque is transmitted from the sprocket 3 to the hub shell 2 by means of the faster running pawls 14 and the ratchet 15. The ratchet 11 overtravels the pawls 10, and the hub shell 2 rotates faster than the sprocket 3.

The bracket 17 carrying the flyweights 16 on the coupling sleeve 22 is rotated faster than the hub shell 2 by the differential gearing interposed between the first transmission and the sleeve 22. The ring gear 9 rotates at higher speed than the planet carrier 5. The effective input speed of the differential gearing in each of the illustrated embodiments thus is equal to the difference between the rotary speeds of the ring gear 9 and of the planet carrier 5. Further speed relationships are evident from the diagrammatic illustration of the several gear trains in FIGS. 5 to 8 respectively.

Figure 8:
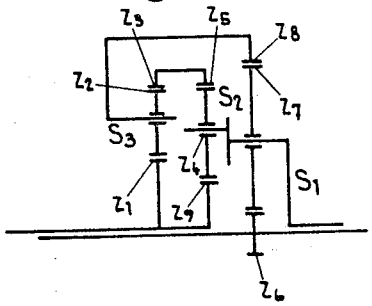

In FIGS. 5 to 8, the number of gear teeth in the several gears and gear rims are identified by algebraic symbols $z_1$, $z_2$, etc., $S_1$ represents the planet carrier 5 of the first transmission, and the planet carrier of the second transmission is indicated at $S_2$, an additional planet carrier of the second transmission being designated $S_3$ in FIG. 8.

Figure 5:
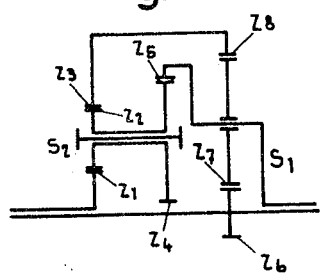
FIGS. 5 to 8 respectively represent the gearing elements of the devices of FIGS. 1 to 4 respectively in conventional symbols.

Referring to FIG. 5, which corresponds to FIG. 1, $z_1$ is the number of teeth on the gear rim 37 of the coupling sleeve 22, $z_2$ similarly relates to the gear rim 33 on the planet wheel 31, $z_3$ to the gear teeth 36 on the ring gear 9, $z_4$ to the gear rim 32, $z_5$ to the teeth on the retaining ring 23, $z_6$ to the sun gear 8, $z_7$ to the planet gears 7, and $z_8$ to the teeth of the ring 9 meshing with the planet gears 7. It can readily be shown that the transmission ratio $i$ of the differential gearing is calculated from the following equation, $$i = \frac{1 - \frac{z_5 \times z_2}{z_4 \times z_3}}{1 + \frac{z_5 \times z_2}{z_4 \times z_3}}$$

and that the rotary speed of the coupling sleeve 22 is 5.175 times the rotary speed of the planet carrier 5 if the numbers of teeth $z_1$ to $z_8$ have the following numerical values, in sequence: 14, 12, 38, 18, 44, 16, 18, and 52.

Figure 6:
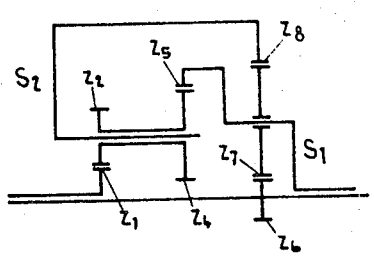
Figure 7:
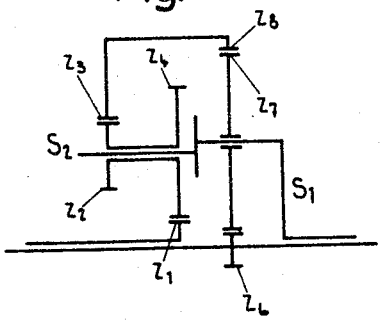

In the diagram of FIG. 6 corresponding to FIG. 2, the symbols $z_1$, $z_2$, $z_4$, $z_5$, $z_6$, $z_7$, $z_8$, in sequence, relate to elements 37, 32, 33, 28, 8, 7, and 9 of FIG. 2, and the rotary speed $n_{z1}$ of the coupling sleeve 22 is related to the rotary speed $n_{s1}$ of the sprocket 3 by the formula $$n_{z1} = \left[\left(1 + \frac{z_5 \times z_2}{z_4 \times z_1}\right) \times \frac{z_6}{z_8} + 1\right] \times n_{s1}$$

Similarly, the rotary speed of the coupling sleeve 22 is related to the sprocket speed in the embodiment of FIG. 3, as represented in FIG. 6, by the formula $$n_{z1} = \left(1 - \frac{z_3 \times z_4 \times z_6}{z_2 \times z_1 \times z_8}\right) \times n_{s1}$$

wherein $z_1$, $z_2$, $z_3$, $z_4$, $z_6$, and $z_8$ respectively represent the numbers of teeth on elements 37, 33, 36, 32, 8, and 9, in sequence.

For the dual-speed hub shown in FIG. 4, and further illustrated in FIG. 8, the speed ratio of the coupling sleeve 22 and of the planet carrier 5 is expressed by the formula $$n_{z1,9} = \left(\frac{z_1 + z_2}{z_1 + z_2 - z_4} \times \frac{z_6}{z_8} + 1\right) \times n_{s1}$$

wherein $z_1$, $z_2$, $z_4$, $z_6$, $z_8$, $z_9$ respectively represent the number of teeth on elements 44, 38, 39, 8, 9, and 45, in sequence.

The use of a differential gearing, such as epicyclic gearing of the types described with reference to the several figures of the drawing, thus permits the rotary speed of the flyweights 16 to be increased much over that of the input sprocket 3 and of the directly coupled driver 4 and planet carrier 5. The free space available in this arrangement axially between the flyweights 16 and the bearing member 30, and radially between the hub shell 2 and the flyweights 16 may be used to advantage for installing an internal brake operated by back-pedalling.

Obviously, differential gearing other than shown in the drawing may be substituted for the specific embodiments described above in detail, and other modifications and variations of the apparatus chosen for the purpose of the disclosure will readily suggest themselves to those skilled in the art. The invention, while described with reference to dual-speed transmissions, is not limited to any specific number of transmission ratios between the driver 4 and the shell 2, nor to details of the first transmission other than the provision of a ring gear and a planet carrier rotating at different speeds.

What is claimed is:

1. In a multiple-speed hub for the wheel of a vehicle with automatic change in transmission ratio, the hub including a hub shell; a rotatable driver member; a first planetary transmission operatively interposed between said driver member and said hub shell and including a sun gear, a ring gear, and a planet carrier having a common axis, and a planet gear mounted on said planet carrier in simultaneous meshing engagement with said sun gear and said ring gear, whereby said planet carrier and said ring gear rotate about said common axis at different speeds relative to said sun gear; a centrifugally operated shifting mechanism for changing the transmission ratio of said first transmission, the shifting mechanism including a support rotatable about an axis, a flyweight mounted on said support for movement toward and away from the axis of rotation of said support, and motion transmitting means connecting said flyweight to said first transmission; and a second transmission connecting said mechanism to said first transmission for rotation of said support by said driver member at a speed higher than the speed of said driver member, the improvement in said second transmission which comprises:

differential gearing in said second transmission, said differential gearing including
 (a) two input members respectively meshing with said ring gear and said planet carrier;
 (b) an output member meshingly connected to said input members for rotation of said output member at a speed proportional to the difference in the rotary speeds of said input members; and
 (c) coupling means coupling said output member to said support for rotating the same at a speed higher than the speeds of said ring gear and of said planet carrier.

2. In a hub as set forth in claim 1, said differential gearing including an epicyclic gear train.

3. In a hub as set forth in claim 2, said gear train including a planet wheel carrying two gear rims of different diameter.

4. In a hub as set forth in claim 3, an internally toothed ring on said planet carrier, said coupling means including a coupling member connected to said support for simultaneous rotation and a gear rim on said coupling member, one of the gear rims on said planet wheel meshing with said internally toothed ring, and the other gear rim of said planet wheel simultaneously meshing with said ring gear and with the gear rim on said coupling member, said epicyclic train further comprising a carrier member rotatable on said coupling member about the axis of the gear rim of the same and carrying said planet wheel, 5. In a hub as set forth in claim 3, an internally toothed ring on said planet carrier, said planet wheel being mounted on said ring gear and radially spaced from said common axis, said coupling means including a coupling member connected to said support for simultaneous rotation and a gear rim on said coupling member, one of the two gear rims on said planet wheel meshing with said internally toothed ring, and the other one of said two gear rims meshing with the gear rim on said coupling member.

6. In a hub as set forth in claim 3, said coupling means including a coupling member connected to said support for simultaneous rotation and a gear rim on said coupling member, said planet wheel being mounted on said planet carrier and radially spaced from said common axis, one of the two rims of said planet wheel meshing with said ring gear, and the other one of said two gear rims meshing with the gear rim on said coupling member.

7. In a hub as set forth in claim 6, a shaft radially spaced from said common axis on said planet carrier, said planet gear and said planet wheel being rotatably mounted on said radially spaced shaft.

8. In a hub as set forth in claim 2, a first planet wheel mounted on said planet carrier and spaced radially from said common axis, a second planet wheel mounted on said ring gear and spaced radially from said common axis and axially from said first planet wheel, a common gear enveloping said planet wheels and meshing with the same, said coupling means including a coupling member connected to said support for simultaneous rotation and rotatable about said common axis and two gear rims on said coupling member, said two gear rims respectively meshing with said first and second planet wheels.

9. In a hub as set forth in claim 8, a shaft radially spaced from said common axis on said planet carrier, said planet gear and said first planet wheel being rotatably mounted on said radially spaced shaft.

References Cited

UNITED STATES PATENTS

| 2,910,157 | 10/1959 | Gleasman | 74—752 |
| 3,180,167 | 4/1965 | Paschakarnis | 74—752 |
| 3,369,429 | 2/1968 | Kimpflinger et al. | 74—752 |
| 3,388,617 | 6/1968 | Nelson | 74—752 |
| 3,438,283 | 4/1969 | Schwerdhofer | 74—750 |

FOREIGN PATENTS 245,261 10/1946 Switzerland.

WILLIAM L. FREEH, Primary Examiner

U.S. Cl. X.R.

74—750